Jan. 30, 1968  A. J. BENNETT  3,366,000
FASTENING DEVICE
Filed May 10, 1966

INVENTOR.
Alan James Bennett
Teare, Teare & Sammon
ATTORNEYS

United States Patent Office 3,366,000
Patented Jan. 30, 1968

3,366,000
FASTENING DEVICE
Alan James Bennett, Glamorgan, Wales, assignor to Tinnerman Products, Inc., Cleveland, Ohio, a corporation of Ohio
Filed May 10, 1966, Ser. No. 548,923
Claims priority, application Great Britain, May 11, 1965, 19,753/65
1 Claim. (Cl. 85—72)

ABSTRACT OF THE DISCLOSURE

A polymeric fastening device for securement in an apertured support member comprising a head and a shank having resilent legs depending from the head. A locking member including a transverse support member severably attached to the shank legs, a connecting member extending axially downwardly from the transverse support member and a transverse locking member attached to the connecting member to impart spreading deformation to the shank legs upon application of pressure to the head.

---

This invention relates to fastening devices, and more particularly relates to a unitary, one piece fastening device of the blind-fixing rivet type adapted to be secured in an apertured support member, such as a panel or the like, by insertion of the device through the aperture in the panel so that the device is locked in fixed position by application of pressure, such as a blow, applied to the device for locking two or more parts together.

Accordingly, an object of the present invention is to provide a novel construction for a fastening device of the blind-rivet type which is a rugged unitary construction and economic to produce; which may be quickly and easily installed for joining two or more members, such as panels or the like, together; and which may be efficiently installed in inaccessible or blind locations with a minimum of effort.

Another object of the present invention is to provide a fastening device of the character described which may be made from polymeric materials and which comprises a head portion, a shank extending from the head portion, the shank having a slot extending from one end thereof, and a locking means integrally attached adjacent the end of the shank and adapted to be severed therefrom and movably received in the slot for deforming the shank outwardly upon application of a predetermined pressure to the head portion for locking two or more apertured support members together in the installed position thereof.

The novel features of the present invention will be apparent from the following description of one form of the fastening device in accordance with the invention, which is given by way of example and illustrated in the accompanying drawings in which.

Figure 1:
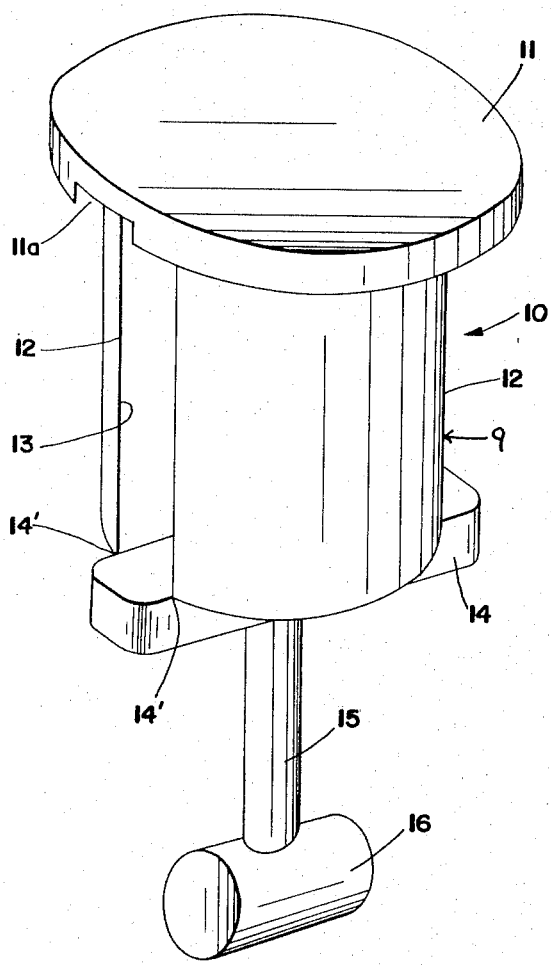
FIG. 1 is a generally perspective view of the fastening device made in accordance with the invention.
Figure 2:
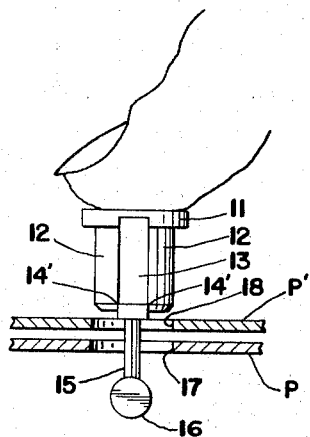
FIG. 2 is a side view on a reduced scale and partly in section showing the fastening device of the invention about to be inserted through registered apertures in two superimposed support members, such as panels.
Figure 3:
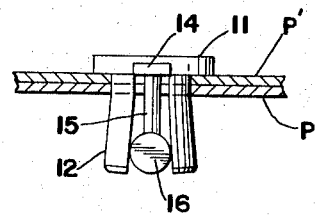
FIG. 3 is a side view corresponding generally to that of FIG. 2, but showing the fastening device in its installed position.

As best shown in FIGS. 1 to 3, the fastening device, designated generally at 10, may comprise a head portion 11 which may be of any suitable shape, such as the circular shape shown. The head portion 11 may be provided on its under side with an elongated, centrally disposed recess 11a which extends throughout the diameter of the head portion 11. A shank, designated generally at 9, may depend downwardly from the underside of the head portion 11. The shank 9 may be of a generally cylindrical shape and may comprise two resilient legs 12 which extend parallel to each other, and on opposite sides of the recess 11a, and spaced apart along their axial lengths by a slot 13 having a width which is generally equal to the width of the recess 11a.

A locking means may be attached to the lower ends of the legs 12 and may include a transverse support member 14 which may be integrally, but severably attached, as at 14', to the respective legs 16. Such integral, but severable attachment may be accomplished, for instance, by a thin frangible fillet provided, such as by molding, adhesives, or the like, which extends along the opposite sides of the transverse support member 14. A stem portion 15, such as an axial pin, may depend downwardly from the midpoint of the transverse support member 14 and supports at its lower end a locking member 16, such as a bar, which may preferably be of a generally cylindrical shape, and which may extend parallel to the transverse support member 14. Thus the transverse support member 14 and the stem portion 15 together define a generally T-shaped configuration in side elevation.

In accordance with the invention, the transverse support member 14 preferably has a length, width and depth generally equal to the corresponding dimensions of the recess 11a provided in the under side of the head portion 11. The locking member 16 is preferably shorter in length than the transverse support member 14, and preferably has a length not greater than the maximum transverse dimension, such as diameter, of the shank 9. Preferably, the maximum transverse dimension of the locking member 16, such as its diameter, is greater than the maximum transverse width of the slot 13, and for the purposes and advantages as will hereinafter be more fully described.

In operation for securing two or more support members P and P', such as panels or other flat plate-like members, together, the fastening device 10 may be inserted through two superimposed holes 17 and 18 provided in the support members P and P'. Preferably, the holes 17 and 18 have a maximum transverse dimension, such as diameter, just sufficient to receive therethruhtheog sufficient to receive therethrough the shank 9 of the device. Upon insertion and after the locking member 16 and stem portion 15 have passed through the holes 17 and 18, the transverse support member 14 is brought to rest on the confronting upper surface of the support panel P'. In this position, pressure may then be applied to the head portion 11, such as by a blow applied by the finger as illustrated in FIG. 2, so that the severable connections, as at 14', between the transverse support member 14 and the respective legs 12 are severed which enables the legs 12 to pass downwardly through the holes 17 and 18 until they reach the locking member 16, whereupon, they will be splayed outwardly to prevent withdrawal of the fastening device from its installed position, as best seen in FIG. 3. In its final installed and fixed position, the transverse support member 14 is received in the diametral recess 11a in the under side of the head portion 11 so that the head portion will lie flush with the confronting upper surface of the support member P' in the installed position thereof. By this arrangement, it will be evident that the fastening device is substantially tamper-proof and can be inserted and locked in position in a single operation.

Figure 4:
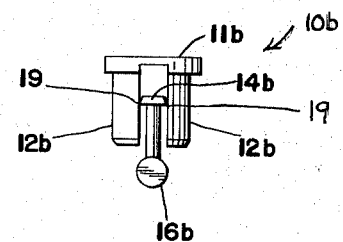
FIG. 4 is a side view on a reduced scale and partly in section showing a modified form of the fastening device of the invention.

In FIG. 4 there is shown a modification of the fastening device of the invention, designated generally at 10b which similarly includes a head portion 11b from which extends a shank defined by laterally spaced apart and parallel extending resilient legs 12b. In this form, however, the transverse support member 14b is preferably, in its initial installed position, located generally intermediate the ends of the legs 12b by severable connections, as at 19, of the aforementioned frangible fillet type. This arrangement has the additional advantage that the legs 12b of the shank will locate the fastening device correctly within the holes provided in the support members, such as panels or the like, before application of pressure, such as a blow, applied to the head portion 11b for installing the device in its fixed position.

In accordance with the invention, the fastening device described in the foregoing embodiments may preferably be fabricated in a one piece construction from suitable polymeric materials, such as for example nylon or the like.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

I claim:

1. A unitary, one-piece fastening device made from a plastic material for securement in an apertured support panel comprising, a generally flat head, a shank made integral with and extending downwardly from said head, the shank being of a generally cylindrical shape in transverse cross-section including a pair of oppositely disposed resilient legs separated by a slot extending lengthwise of the shank, and a locking means severably attached adjacent the free ends of said legs and adapted to be slidably received in said slot for outward spreading movement of said legs upon application of pressure to said head, said locking means being of a generally T-shaped configuration including a transverse support member severably attached to the free ends of said legs, said transverse support member having a polygonal shape in transverse cross-section with a width less than that of said slot and a length greater than the maximum transverse dimension of said shank, an elongated, cylindrical connecting member extending vertically downwardly from said support member, and an elongated, cylindrical locking member attached centrally of said connecting member and extending generally parallel to said support member, the locking member having a length less than said support member and a diameter which is greater than the width of the slot between said legs for spreading said legs outwardly into engagement with said support panel upon downward movement of said shank through the aperture in said support panel resulting from the application of said pressure to said head.

References Cited

UNITED STATES PATENTS

| 2,409,180 | 10/1941 | Annett | 85—38 |
| 2,424,602 | 7/1947 | De Swart | 85—72 |
| 2,997,910 | 8/1961 | Tinnerman | 85—77 |
| 3,172,329 | 3/1965 | Setzler | 85—72 |

FOREIGN PATENTS

| 127,529 | 5/1948 | Australia. |

EDWARD C. ALLEN, *Primary Examiner.*